US011993966B2

(12) United States Patent
Boisnier et al.

(10) Patent No.: US 11,993,966 B2
(45) Date of Patent: May 28, 2024

(54) DOOR HINGE FOR AN ELECTRICAL CABINET

(71) Applicant: SAFRAN ELECTRICAL & POWER, Blagnac (FR)

(72) Inventors: Benjamin Boisnier, Moissy-Cramayel (FR); Loïc Lemasson, Moissy-Cramayel (FR); Philippe Pierre Avignon, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 410 days.

(21) Appl. No.: 17/415,950

(22) PCT Filed: Dec. 18, 2019

(86) PCT No.: PCT/FR2019/053135
§ 371 (c)(1),
(2) Date: Jun. 18, 2021

(87) PCT Pub. No.: WO2020/128315
PCT Pub. Date: Jun. 25, 2020

(65) Prior Publication Data
US 2022/0065013 A1 Mar. 3, 2022

(30) Foreign Application Priority Data
Dec. 21, 2018 (FR) ..................................... 1873906

(51) Int. Cl.
*E05D 11/00* (2006.01)
*H02B 1/38* (2006.01)
(52) U.S. Cl.
CPC ........... *E05D 11/0081* (2013.01); *H02B 1/38* (2013.01)

(58) Field of Classification Search
CPC ......... E05D 11/0081; E05D 1/06; E05D 7/10; H02B 1/38; E05Y 2900/20
See application file for complete search history.

(56) References Cited

U.S. PATENT DOCUMENTS 3,860,312 A * 1/1975 Gordon, Jr. ............ H01R 24/58
439/31
4,116,514 A * 9/1978 Lawrence ........... E05D 11/0081
439/31
(Continued)

FOREIGN PATENT DOCUMENTS

CA 2934696 A1 * 1/2017 ............. A47B 97/00
CN 103628763 A * 3/2014
(Continued)

OTHER PUBLICATIONS

Search Report issued in French Patent Application No. 1873906 dated Oct. 14, 2019.
(Continued)

*Primary Examiner* — Hanh V Tran
(74) *Attorney, Agent, or Firm* — Pearne & Gordon LLP

(57) ABSTRACT

A door hinge for an electrical cabinet includes a pathway for receiving an electrical harness, the hinge including two parts that are connected together and are rotatable with respect to one another about a pivot axis, the hinge including a duct that extends along the pivot and is designed to receive an intermediate section of the harness along the pivot axis, the duct including a longitudinal slot for the lateral insertion of the intermediate section of the harness into the duct while the intermediate section extends parallel to the duct. An electrical cabinet includes such a door hinge.

9 Claims, 2 Drawing Sheets

(56) References Cited

U.S. PATENT DOCUMENTS

| | | | | |
|---|---|---|---|---|
| 5,715,761 | A * | 2/1998 | Frattini | A47B 21/06 108/50.02 |
| 5,951,312 | A * | 9/1999 | Horng | G06F 1/1683 439/165 |
| 6,350,956 | B1 * | 2/2002 | Sakata | B60R 16/0215 174/101 |
| 7,267,566 | B2 * | 9/2007 | Ku | G06F 1/1683 439/165 |
| 7,824,200 | B2 * | 11/2010 | Bryla | E05D 11/0081 439/165 |
| 8,250,713 | B2 * | 8/2012 | Lin | G06F 1/1681 16/376 |
| 8,366,220 | B2 * | 2/2013 | Oberhauser | E05D 3/16 312/405 |
| 8,769,771 | B2 * | 7/2014 | Hsu | G06F 1/1683 16/386 |
| 11,211,847 | B2 * | 12/2021 | Abe | E05F 7/00 |
| 2002/0112320 | A1 * | 8/2002 | Hayashi | E05D 11/0081 16/386 |
| 2007/0234513 | A1 * | 10/2007 | Luo | G06F 1/1616 16/223 |
| 2014/0210328 | A1 * | 7/2014 | Akalan | E05D 7/00 312/326 |
| 2014/0220790 | A1 * | 8/2014 | Lee | E05D 11/0081 439/31 |
| 2017/0306674 | A1 * | 10/2017 | Soloski | E05D 11/0081 |

FOREIGN PATENT DOCUMENTS

| | | | | |
|---|---|---|---|---|
| CN | 111140115 | A * | 5/2020 | B60J 5/0468 |
| EP | 3321411 | A1 * | 5/2018 | D06F 39/14 |
| KR | 20160111076 | A * | 9/2016 | |
| KR | 20170014256 | A * | 2/2017 | |
| KR | 20180099359 | A * | 9/2018 | B60J 5/0468 |
| WO | WO-2005106171 | A1 * | 11/2005 | E05D 11/0081 |
| WO | WO-2005108725 | A1 * | 11/2005 | E05D 11/0081 |

OTHER PUBLICATIONS

International Search Report for issued in Application No. PCT/FR2019/053135 dated Apr. 9, 2020.
Written Opinion for PCT/FR2019/053135 dated Apr. 9, 2020.

* cited by examiner

DOOR HINGE FOR AN ELECTRICAL CABINET

This is the National Stage of PCT international application PCT/FR2019/053135, filed on Dec. 18, 2019 entitled "DOOR HINGE FOR AN ELECTRICAL CABINET", which claims the priority of French Patent Application No. 1873906 filed Dec. 21, 2018, both of which are incorporated herein by reference in their entirety.

TECHNICAL FIELD

The invention generally relates to a door hinge for electrical cabinet, and more particularly to a door hinge for electrical cabinet including a path for receiving an electrical harness. The invention also relates to an electrical cabinet comprising such a hinge conveying an electrical harness.

STATE OF PRIOR ART

Recent aircrafts include many electrical/electronic cabinets, including many components. Due to space limitations, some components are even mounted to the inner side of the door of such a cabinet. Typically, such a door is mounted to the frame of the cabinet and equipped with hinges so that it can be opened and closed, while the components mounted to the door are connected to those inside the electrical cabinet by means of an electrical harness.

Generally speaking, the harness is conveyed from the electrical cabinet to the door, perpendicular to the door/cabinet junction. For safety reasons, this harness is secured, on the one hand, to the door and, on the other hand, to the fixed part of the electrical cabinet, in the vicinity of the door/cabinet junction, leaving a free loop between the door and the fixed part to pass through the junction. This loop must be left long enough to avoid that it is mechanically tensioned when the door is opened. In this way, the space in the electrical cabinet is used more efficiently.

However, when opening or closing, this loop mainly works by bending, in that it straightens and curves. This subjects the harness to localised mechanical tension which can damage it. In addition, this loop protrudes into the interior of the electrical cabinet and is therefore likely to rub or catch on any component upon closing, which can lead to serious consequences. Sometimes the loop has a resistance to opening and closing of the door, especially when the harness is of large cross-section area.

There is therefore a need for an electrical cabinet in which the harness is better conveyed and less likely to be damaged.

DISCLOSURE OF THE INVENTION

It is therefore an object of the present invention to overcome the aforesaid needs and disadvantages by providing a door hinge for electrical cabinet having a path for receiving an electrical harness, the hinge comprising two parts connected to each other and rotatably movable relative to each other, about a pivot axis, the hinge comprising a chute extending along the pivot axis and arranged to receive an intermediate section of the harness along the pivot axis, the chute comprising a longitudinal slot for laterally inserting the intermediate section of the harness into the chute even though it extends parallel to the chute.

Preferably, the hinge comprises fastening elements arranged to secure the intermediate section of the harness to the pivot axis.

Preferably, the fastening elements are hooks.

Even more preferably, the chute is in the form of a half-tube, and the fastening elements are half-tube shells.

Advantageously, the hinge is further arranged to receive an upstream section of the harness extending non-parallel to the pivot axis and a downstream section of the harness extending non-parallel to the pivot axis.

Preferably, the hinge comprises fastening elements arranged (36) to secure the upstream section of the harness and the downstream section of the harness.

Preferably, the hinge comprises two pivots on which the two hinge parts are arranged to be rotatably movable about the pivot axis, the pivots being located at opposite ends of the chute.

More preferably, the two parts of the hinge are clipped together in the place where the pivots are located.

Advantageously, the hinge is arranged to receive the harness in such a way that the upstream section of the harness and the downstream section of the harness respectively join the intermediate section of the harness between the two pivots.

The object of the present invention also provides an electrical cabinet comprising a fixed part, a door, an electrical harness and a door hinge according to any of the preceding claims, the door being mounted to the fixed part of the electrical cabinet via the hinge, the harness comprising an upstream section of the harness extending non-parallel to the pivot axis, then an intermediate section of the harness received in the chute and extending along the pivot axis, and then a downstream section of the harness extending non-parallel to the pivot axis.

BRIEF DESCRIPTION OF THE DRAWINGS

Preferred embodiments of the invention are described below by way of non-limiting examples, with reference to the appended drawings, in which.

In all these figures, identical references may refer to identical or similar elements. Further, the various parts represented in the figures are not necessarily drawn to a uniform scale, in order to make the figures more legible.

DETAILED DISCLOSURE OF PARTICULAR EMBODIMENTS

Figure 1:
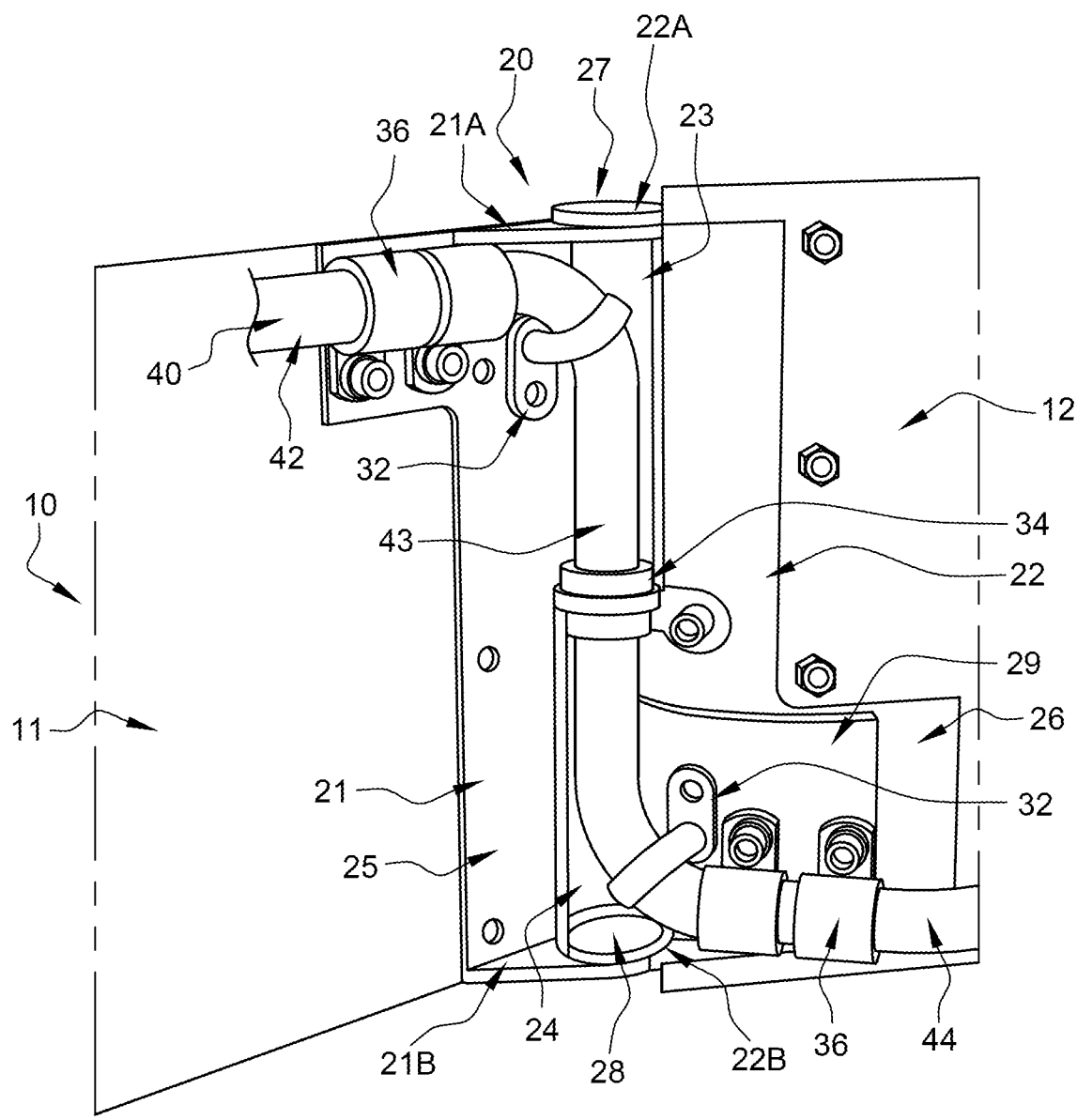
FIG. 1 shows a perspective view of an electrical cabinet fitted with a hinge according to a preferred embodiment of the invention.

FIG. 1 represents an electrical cabinet 10, for example to be mounted in an aircraft, said electrical cabinet comprising a door hinge 20 having a path for an electrical harness 40, according to a preferred embodiment of the invention.

The hinge 20 is comprised of two main parts 21, 22 connected to each other and rotatably movable, one with respect to the other about a pivot axis.

The electrical cabinet 10 itself is essentially of the same type as that previously described in the introductory part, namely comprising a fixed part 11 and a door 12 (movable part) for gaining access to the interior of the electrical cabinet 10. In the figures, the two parts 21, 22 of the hinge 20 are illustrated in a right-left orientation on a pivot axis which is substantially vertical, the left part 21 of the hinge is secured to the fixed part 11 of the electrical cabinet, while the right part 22 is secured to the door 12.

The hinge 20 comprises a chute 23 for receiving the harness 40. This chute 23 extends along the pivot axis of the hinge 20 from a top end to a bottom end. The pivot axis passes inside the chute 23, the wall of the chute 23 being spaced from this pivot axis. The chute 23 includes a longitudinal slot 24 on the side, extending along the length of the chute 23 and providing access to its interior part.

The chute 23 is designed so that a harness 40 can be inserted thereinto through the longitudinal slot 24. More precisely, a section of the harness 40 can be laterally inserted into the chute 23, even though this section extends parallel to the chute 23. In FIG. 1, the chute 23 is shown with an intermediate section 43 of the harness already inserted into and extending along the axis or substantially along the pivot axis. This harness 40 will be disclosed later in the description.

Considering the chute 23 in more detail, it is noticed that an upper half is arranged on the left part 21 of the hinge 20 and a lower half is arranged on the right part 22. Other constructions are of course possible, for example, a major portion of the chute 23 can be disposed on one part of the hinge 20 and a minor portion disposed on the other part. Of course, as the two parts 21, 22 of the hinge are rotatably movable relative to each other, it is understood that insertion of the harness 40 through the longitudinal slot 24 will be easier when the two parts 21, 22 of the hinge 20 form a sufficiently large angle.

The hinge 20 comprises two pivots 27, 28, at the top and bottom, at opposite ends of the chute 23. These pivots 27, 28 allow the two parts 21, 22 to be connected while allowing them to be rotatably movable relative to each other. These pivots 27, 28 are embodied as a flange of one part of the hinge 20 superimposed on a flange of the other part of the hinge 20. Here, for the pivot 27 at the top of the hinge 20, the flange 21A of the left part 21 of the hinge 20 has a lug which is accommodated in a hole provided in the flange 22A of the right part 22. Similarly, for the pivot 28 at the bottom of the hinge, the flange 22B of the right part 22 has a lug which is accommodated in a hole provided in the flange 21B of the left part 21. These pivots 27, 28 are, of course, on the pivot axis, and thus allow the two parts 21, 22 of the hinge 20 to pivot.

Other types of pivots can be contemplated by the person skilled in the art without departing from the scope of the present invention. For example, one part of the hinge 20 can comprise the flanges with the holes, while the other part of the hinge 20 can comprise flanges with the lugs. Alternatively, the two flanges on one part of the hinge 20 can be located between the two flanges on the other part of the hinge 20.

In some cases, the pivots can also be designed to allow the two parts of the hinge 20 to be effectively "clipped" together. For example, the flanges can be sufficiently elastic to be connected together when the two parts of the hinge 20 are pushed against each other.

Each part 21, 22 of the hinge 20 also comprises a respective plate 25, 26. The plates 25, 26, which are secured to the chute 23, or can even define part of the chute 23, form the parts of the hinge 20 for being secured to the door 12 and the fixed part 11 of the electrical cabinet. They are provided with holes to be secured to the electrical cabinet 10, for example with screws or bolts. One or more hinges 20 can be used depending on structural requirements and the number of harnesses. The hinge 20 can be made by moulding or additive printing, especially its two main parts 21, 22. Preferably, it is made of thermoplastic material, although other materials can also be suitable.

The harness 40 extends from the components mounted in the fixed part 11 of the electrical cabinet 10 to the components mounted to its door 12. It therefore passes through the door/cabinet junction. As described above, the harness 40 comprises an intermediate section 43 of the harness which is placed in the chute 23. The harness 40 further comprises an upstream section 42 and a downstream section 44 on either side of the intermediate section 43 of the harness. Generally, these upstream and downstream sections 42, 44 are each at an angle to the pivot axis, typically a right angle. In the figure, they have been represented as extending in horizontal directions, except in the zones where they enter and exit the chute 23, zones in which they are curved. These upstream and downstream sections 42, 44 of the harness join the intermediate section 43 of the harness at points located on the two pivots 27, 28 along the pivot axis.

The intermediate section 43 of the harness which is in the chute 23 extends along the pivot axis. The chute 23 has an internal diameter for accommodating the harness 40 and ensuring as far as possible that it extends along the axis or even parallel to the pivot axis.

Fastening elements 32, 34, 36 are provided on the hinge to hold the harness 40 in place once it is placed in the chute 23. They are disposed at various points along the harness 40. These fastening elements can be hooks 32, 34 for securing the intermediate section of the harness 43 and curving it at the ends of the chute 23. In this embodiment, the hook 34 in the middle also aids in stabilising the two parts 21, 22 of the hinge upon pivoting. It has a sleeve set into the chute 23 to better align the upper and lower halves of the chute 23, as well as better centre the harness 40. It further has a peripheral rib interposed between the upper and lower halves of the chute 23 to prevent them from coming closer to each other and to guide pivoting of the two parts 21, 22 of the hinge 20. These three hooks 32, 34 are mainly used to hold and guide the harness 40 all the way, without tightening it, in order to allow it some slack during opening and closing of the door 12.

Regarding the downstream and upstream sections 42, 44 of the harness, they are secured using clamps 36 as fastening elements. These clamps 36 are to keep the harness stationary unlike the hooks 32, 34 which allow some slack. The clamps 36 are secured to the plates 25, 26 of the left part 21 and the right part 22 of the hinge 20, although they can be secured directly to the electrical cabinet 10.

To facilitate the installation of the harness 40, the fastening elements 32, 34, 36 are designed to allow side access. In other words, the harness 40 can be placed in the hinge 20 without the need to first install the fastening members 32, 34 from one end of the harness 40. Besides, the hinge 20 can further comprise a profile plate 29 to more gently guide the upstream and downstream sections 42, 44 of the harness. These fastening elements 32, 34, 36, as well as the profile plate 29, can be made by moulding or additive printing. Preferably, they are made of thermoplastic material, although other materials can also be suitable.

Due to this invention, the harness 40 is subjected to lower mechanical stresses during use, no longer working mainly in bending but in torsion. Indeed, being positioned along the axis or substantially along the pivot axis, the harness 40 now works mainly in torsion upon opening and closing the door. More precisely, as the intermediate section of the harness 43 is coaxial or substantially coaxial with the pivot axis of the hinge 20, opening and closing the door 11 with respect to the fixed part 12 of the electrical cabinet 10, with which the upstream and downstream sections of the harness 42, 44 are integral, only generates a torsion load in the intermediate section, this load being evenly distributed along this intermediate section.

Further, the possibility to mount the harness 40 laterally with respect to the hinge 20, even when it extends parallel to the chute 23, greatly facilitates installation. In particular, it can be installed in the hinge 20 after the hinge 20 is assembled or even mounted to the electrical cabinet 10. In other words, there is no need to disassemble the hinge 20 or to remove it from the electrical cabinet 10 to insert the harness 40. The installer therefore has the freedom to choose how to install the hinge 20 and/or the harness 40, depending on the environment. Such flexibility and speed of installation are substantial advantages, especially in an aircraft where space is limited. The door hinge 20 according to the present invention represents a significant improvement.

Figure 2:
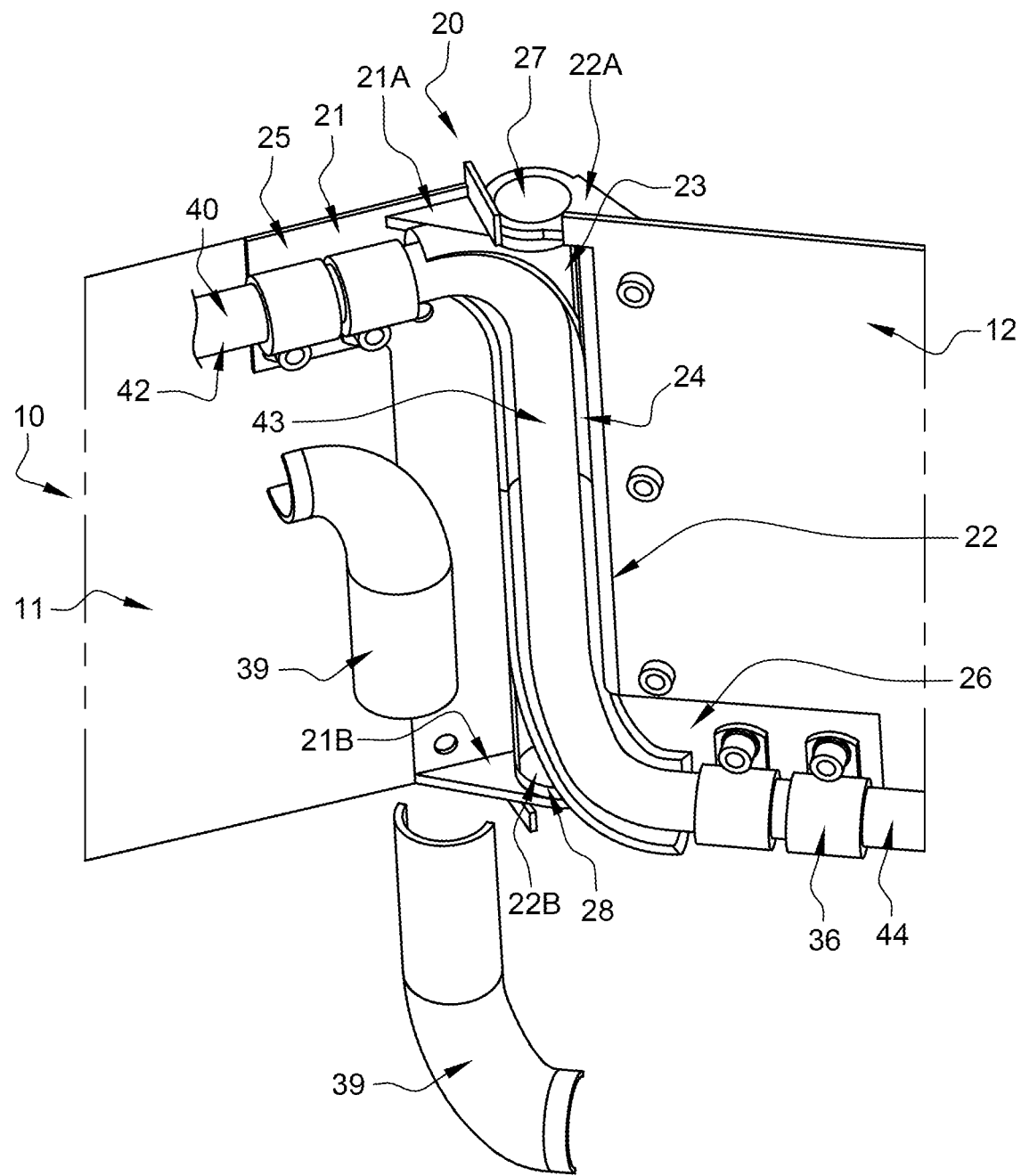
FIG. 2 shows a perspective view of an electrical cabinet fitted with a hinge according to an alternative embodiment of the invention.

FIG. 2 illustrates an alternative embodiment of the invention. This alternative embodiment is largely similar to the embodiment represented in FIG. 1. The same elements as previously described are given the same reference numerals as in FIG. 1. This door hinge is different in that the harness 40 is here retained in a tube. More specifically, the chute 23 is in the form of a half-tube, that is, cut out along the direction of its length. This half-tube comprises a straight half-tube portion in the middle which is parallel to the pivot axis, as well as curved half-tube portions at both ends of the chute. Like the hinge 20 described above, an upper half of the half-tube is disposed on the left part 21 of the hinge and a lower half disposed on the right part 22.

Once the harness 40 is placed in the chute 23, the fastening elements 39, in the form of two half-tube shells complementary to the shape of the chute, are secured, preferably clipped, to the chute 23. The intermediate section of the harness 43 is thus secured in the tube thus formed, it being set out that the upper part and lower part of the tube are adapted to rotate with respect to each other about the pivot axis. Besides, as the ends of the tube are curved, the harness 40 can therefore be more accurately and uniformly guided, as well as better supported, along its trajectory. Like the hinge 20 previously described, the half-tube shells 39 allow some slack for the harness, and the intermediate section 43 of the harness mainly works in torsion, upon opening and closing the door 12. Furthermore, the half-tube shells 39 (and the chute 23) are preferably made of thermoplastic material, although other materials can also be suitable.

Other alternatives of the door hinge can be contemplated. For example, the chute 23, as well as the intermediate section of the harness 43, can be longer, for example to allow the torsion to be distributed over a longer length of the harness 40 and/or to allow the door 12 to be opened wider. Also, the hinge 20 can be installed at the cabinet to mount the door first, and the harness 40 placed subsequently if required. The hinge 20 can be made in one piece, in the sense that its two main parts 21, 22 cannot be separated. Also, the hinge 20 can be provided with a latch, for example a lug on one part of the hinge adapted to engage with a recess or recesses on the other part, in order to hold the door open at different angular positions.

The invention has been set out for an electrical cabinet 10, especially in an aircraft, with the door hinge 20 mounted to its side. However, it is understood that the hinge 20 can also be mounted in other orientations on the top or bottom of an electrical cabinet, and can even be retrofitted to existing electrical cabinets. It is also understood that the invention is not limited to an electrical cabinet in an aircraft, and can be used in ships, buildings, etc.

What is claimed is:

1. A door hinge for electrical cabinet having a path for receiving an electrical harness, the hinge comprising two parts connected to each other and rotatably movable relative to each other about a pivot axis, and a chute extending along the pivot axis and arranged to receive an intermediate section of the harness along the pivot axis, the chute comprising two portions, each disposed on a part of the hinge, the chute further comprising a longitudinal slot for laterally inserting the intermediate section of the harness into the chute, and fastening elements arranged to secure the intermediate section of the harness along the pivot axis.

2. The door hinge according to claim 1, wherein the fastening elements are hooks.

3. The door hinge according to claim 1, wherein the chute is in the form of a half-tube, and that the fastening elements are half-tube shells.

4. The door hinge according to claim 1, wherein the hinge is arranged to receive an upstream section of the harness extending non-parallel to the pivot axis and a downstream section of the harness extending non-parallel to the pivot axis.

5. The door hinge according to claim 1, wherein the fastening elements are arranged to secure an upstream section of the harness and a downstream section of the harness.

6. The door hinge according to claim 1, further comprising two pivots on which the two parts of the hinge are arranged to be rotatably movable on the pivot axis, the pivots being located at opposite ends of the chute.

7. The door hinge according to claim 6, wherein the two parts of the hinge are clipped together in the place where the pivots are located.

8. The door hinge according to claim 4, further comprising two pivots on which the two parts of the hinge are arranged to be rotatably movable on the pivot axis, the pivots being located at opposite ends of the chute, wherein the hinge is arranged to receive the harness in such a way that the upstream section of the harness and the downstream section of the harness respectively join the intermediate section of the harness between the two pivots.

9. An electrical cabinet comprising a fixed part, a door, an electrical harness and the door hinge according to claim 1, the door being mounted to the fixed part of the electrical cabinet via the hinge, the harness comprising an upstream section of the harness extending non-parallel to the pivot axis, then an intermediate section of the harness received in the chute and extending along the pivot axis, and then a downstream section of the harness extending non-parallel to the pivot axis.

* * * * *